United States Patent [19]

Depp et al.

[11] Patent Number: 4,968,120
[45] Date of Patent: Nov. 6, 1990

[54] MULTICOLOR LIQUID CRYSTAL DISPLAY

[75] Inventors: Steven W. Depp, Katonah; Hiap L. Ong, Pleasantville, both of N.Y.

[73] Assignee: International Business Machines Corp., Armonk, N.Y.

[21] Appl. No.: 263,822

[22] Filed: Oct. 28, 1988

[51] Int. Cl.$^5$ ............................................. G02F 1/133
[52] U.S. Cl. ................................. 350/337; 350/339 F
[58] Field of Search ........................... 350/337, 339 F

[56] References Cited

U.S. PATENT DOCUMENTS

| | | | |
|---|---|---|---|
| 4,506,956 | 3/1985 | Dir | 350/339 F |
| 4,610,507 | 9/1986 | Kamamori et al. | 350/335 |
| 4,632,514 | 12/1986 | Ogawa et al. | 350/339 F |
| 4,684,939 | 8/1987 | Streit | 340/784 |

FOREIGN PATENT DOCUMENTS

| | | | |
|---|---|---|---|
| 0039642 | 9/1986 | Japan | 350/337 |
| 0274920 | 11/1988 | Japan | 350/337 |

OTHER PUBLICATIONS

"Frame-Sequential Electronic Color Display Filters," *IBM Technical Disclosure Bulletin*, vol. 28, No. 6 (Nov. 1985), pp. 2696-2698.
Schadt et al., Voltage-Dependant Optical Activity of a Twisted Nematic Liquid Crystal; Feb. 1971.
Uchida; Multicolored Liquid Crystal Displays; Jun. 1984.
Scheffer et al.; A New, Highly Multiplexable Liquid Crystal Display, Nov. 1984.
Scheffer, et al; Investigation of the Electro-Optical Properties of 270° Chiral Nematic Layers in the Birefringence Mode; Oct. 1985.
Schadt et al.; Electro-optical Performance of a New, Black-White and Highly Multiplexable Liquid Crystal Display; Feb. 1987.
Ong; Optical Properties of General Twisted Nematic Liquid-Crystal Displays; Nov. 1987.
Kosaka et al.; Development of Achromatic and Color LCDs and Their Colorimetric Psychological Evaluation and Optimization;SID 1982.
Kamamori et al.; Multicolor Graphic LCD with Tricolor Layers Formed by Electrodeposition; SID 1984.
Waters et al.; Design of Highly Multiplexed Liquid Crystal Dye Displays; Jul. 1984.
Waters et al.; Highly Multiplexable Dyed LCDs; SID 1984.
Bos et al.; A Full-Color Field-Sequential Color Display; Sep. 1984.
Nagata et al.; Rear-Illuminated Color LCD With Uniform Dark State;SID 1986.
Dir et al.; Rear-Illuminated Color LCD with Uniform Dark State; 1985.
Hotta et al.; Full-Color Multi-Gap LC-TV Display Panel Addressed by a-Si TFTs; SID 1986.
Kinugawa et al.; 640×400 Pixel LCD Using Highly Twisted Birefringence Effect with Low Pretilt Angle; SID 1986.
Latham et al.; A New Class of Color Filters for Liquid-Crystal Displays; SID 1987.

*Primary Examiner*—Stanley D. Miller
*Assistant Examiner*—Anita P. Gross
*Attorney, Agent, or Firm*—Perman & Green

[57] ABSTRACT

A liquid crystal display device is described which includes two transparent sheets separated by a given distance, with liquid crystal material being disposed therebetween. Adjacent one transparent sheet is a stack of at least three pleochroic polarizers which act to separately polarize each incoming primary color wavelength. A second stack of at least three pleochroic polarizers are adjacent the second transparent sheet and are oriented to select the primary color polarizations exiting from the liquid crystal structure.

6 Claims, 5 Drawing Sheets

90° TWISTED NEMATIC LCD

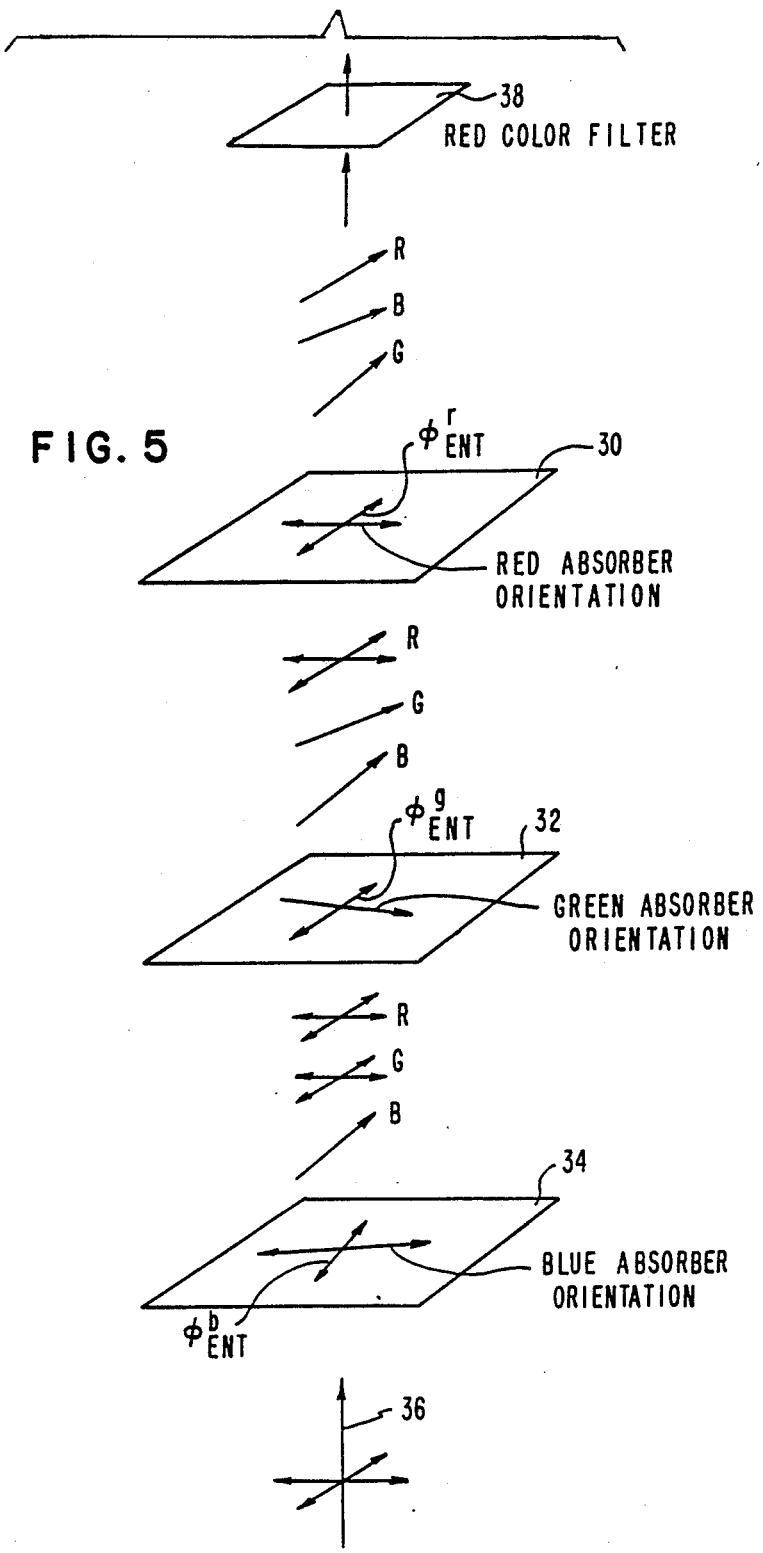

MULTICOLOR LIQUID CRYSTAL DISPLAY

FIELD OF THE INVENTION

This invention relates to multicolor liquid crystal displays and, more particularly, to a multicolor liquid crystal display which exhibits minimum color bleedthrough.

DESCRIPTION OF THE PRIOR ART

There are a number of prior art multicolor displays which employ twisted nematic (TN) liquid crystal (LC) and polarizers. One of the more commonly proposed TNLC displays is shown in FIG. 1. In that cell, the liquid crystal layer serves to twist linearly polarized light from one orientation to another (e.g., from 0° to 90°) The entrance polarizer enables light having a polarization vector 10 to enter into the TN liquid crystal region. If no voltage is applied across the TN liquid crystal, the polarization vector of the light is rotated by 90° until it is parallel with line 12. If the upper polarizer sheet has its direction of polarization 14 oriented parallel to polarization vector 10, theoretically no light should pass to the viewer. In other words, the cell should be "dark". It is known that this is not the case.

In actuality, the structure of FIG. 1 permits "bleedthrough" of various color wavelengths. This results from the fact that linearly polarized light becomes rotationally dispersed as it passes through the TN liquid crystal. In specific, the linear polarization of certain wavelengths is transformed by the liquid crystal material into elliptical polarization and passes, partially, through the second polarizing plate. A simplified analysis of this phenomenon is found in an article by Gooch and Tarry, J. Phys. D,8, 1575 (1975). A more generalized and comprehensive treatment of this phenomenon is presented by one of the inventors hereof, H. L. Ong in "Optical Properties of General Twisted Nematic Liquid-Crystal Displays", Applied Physics Letters 51 (18) pages 1398-1400, (1987). The contents of the Ong paper are incorporated herein by reference.

Analysis of both the Gooch, Tarry equation and the more general equation given by Ong, indicates that for each thickness of a TN liquid crystal, there will be a preferred wavelength which will experience maximum transmittance and minimum rotational dispersion. All other wavelengths will experience differing dispersions and, if subjected to parallel entrance and exit polarizing filters, will "bleed through" when the liquid crystal is in the "dark" or "off" state.

Referring to FIGS. 2a and 2b, charts are shown which, for primary colors red, blue and green, plot the percentage transmission T against the thickness (in microns) of a TN liquid crystal cell. FIG. 2b is an expanded portion of the bottom-most region of FIG. 2a.

From an examination of both FIGS. 2a and 2b (and an analysis in accordance with the equation given by Ong), it is apparent that transmission T is strongly dependent on cell thickness and light wavelength. Thus, while the thickness of a LC cell can be optimized for a particular color, other colors will experience undesired bleed through in the dark state. For instance, assuming that a liquid crystal, having ordinary and extraordinary indices of refractions of 1.50 and 1.59 respectively is employed, the optimized cell thicknesses are 4.62 microns, 5.29 microns, and 6.36 microns for wavelengths of 4,800 Angstroms (blue), 5,500 Angstroms (green), and 6,600 Angstroms (red) respectively. If a cell thickness is optimized for green, at 5.29 microns, the off state transmission for blue and red is 2.4% and 4.5% respectively. Consequently, high contrast ratios are obtained for green, but relatively low contrast ratios are obtained for blue and red.

Ogawa et al, in U.S. Pat. No. 4,632,514 solved this problem by proposing a liquid crystal display of the TN type wherein the cell thickness was optimized for each color picture element. Thus, each red cell thickness was optimized for red light; each green cell for green light and each blue cell for blue light. While this structure did overcome the rotational dispersion problem above discussed, it requires a very complex structure which is expensive to implement.

Dir in U.S. Pat. No. 4,506,956 proposed solving the dispersion problem through the use of a dichroic dye added to the liquid crystal material. The dye mixture, together with high extinction ratio polarizers prevented light bleed through and enhanced the liquid crystal's contrast ratio.

Accordingly, it is an object of this invention to provide a color, TN liquid crystal display which exhibits minimum color bleed through.

It is another object of this invention to provide an optimized, color TN liquid crystal display having a constant thickness liquid crystal cell.

It is still a further object of this invention to provide a color TN liquid crystal display of simple planar construction.

SUMMARY OF THE INVENTION

A liquid crystal display device is described which includes two transparent sheets separated by a given distance, with liquid crystal material being disposed therebetween. Adjacent one transparent sheet is a stack of at least three pleochroic polarizers which act to separately polarize each incoming primary color wavelength. A second stack of at least three pleochroic polarizers are adjacent the second transparent sheet and are oriented to select the primary color polarizations exiting from the liquid crystal structure.

DESCRIPTION OF THE DRAWINGS

FIG. 5 is a schematic blow-up of a composite polarizing sheet and color filter.

DETAILED DESCRIPTION OF THE INVENTION

Figure 1:
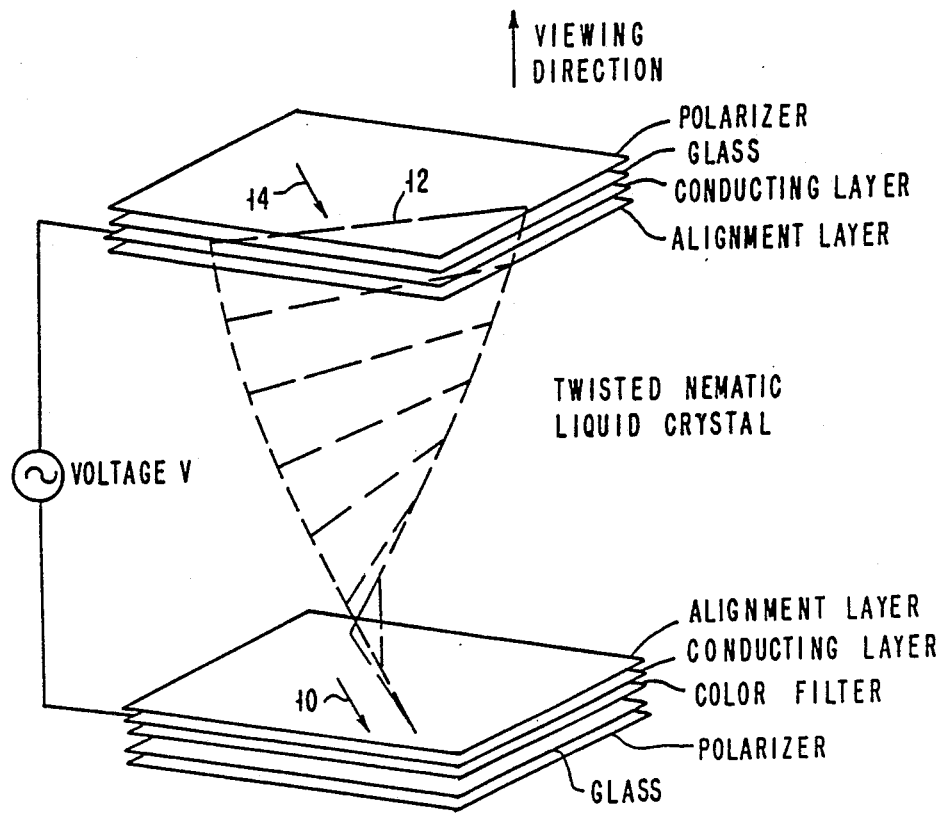
FIG. 1 is a schematic of a prior art, 90° TN left-handed liquid crystal cell.

Prior to describing the invention, definitions are given for LC cell geometry, notations, equations for calculation of off-state transmission and equations for analysis of optimum polarizer orientations.

Entrance and exit polarizers are generally placed respectively before and after the LC layer. An incident optical field, propagating in the $+z$ direction, with polarization defined by the entrance polarizer, is normally incident on the LC medium. In the cell, an LC layer of thickness d is confined between the planes at z=0 and z=d of a Cartesian coordinate system. Both surfaces are treated to give a homogeneous alignment with pretilt angle $\theta_s$ defined with respect to the surface, which is in the xy plane. The LC director at the entrance surface is directed along the x axis; at the exit surface, the LC is directed at an azimuthal angle $\phi$ with respect to the x axis. $\phi$ is denoted the LC twist angle, $\phi_{Ent}$ the entrance polarizer angle, and the exit polarizer angle. All the azimuthal angles ($\phi$, $\phi_{Ent}$ and $\phi_{Exit}$) are negative for the counter clockwise (right-handed) direction, and positive for the clockwise (left-handed) direction.

Equation notations are as follows:
$\lambda$ is the wavelength of the incident light.
$I_s$ is the intensity of the incident light.
d is the cell thickness.

The pretilt angle $\phi_s$ is defined with respect to the surface, $\phi$ denotes the twist angle, $\phi_{Ent}$ - the entrance polarizer angle, $\phi_{Exit}$ - the exit polarizer angle, $n_o$ and $n_e$ are the ordinary and extraordinary indices of refraction.

$$w = n_0^2/n_e^2 - 1, \quad u = \frac{\pi d}{\Phi \lambda}\left(\frac{n_e}{\sqrt{1+w\sin^2\theta_s}} - n_o\right)$$

The formula for calculating off-state transmission is as follows:

For an uniformly twisted nematic cell, the off-state transmitted intensity with normal incidence is $$I = I_0 \left[ \cos^2(\Phi - \Phi_{Exit} + \Phi_{Ent}) + \right.$$

$$\sin^2(\Phi\sqrt{1+u^2})\sin 2(\Phi - \Phi_{Exit})\sin 2\Phi_{Ent} +$$

$$\frac{1}{2\sqrt{1+u^2}}\sin(2\Phi\sqrt{1+u^2})\sin 2(\Phi - \Phi_{Exit} + \Phi_{Ent}) -$$

$$\left. \frac{1}{1+u^2}\sin^2(\Phi\sqrt{1+u^2})\cos 2(\Phi - \Phi_{Exit})\cos 2\Phi_{Ent} \right] \quad (1)$$

For TN LCD's with $\theta_s=0$, $\phi_{Ent}=0$, $\phi_{Exit}=\phi$, the transmission expression reduces to the Gooch and Tarry formula:

$$I = I_0 \{1 - [\sin(2\Phi\sqrt{1+u^2})]/(1+u^2)\}. \quad (2)$$

The formula for calculating optimum polarizer orientation are:

For each LC cell, the optimized exit polarizer angle for wavelength $\lambda$ is given by $$\Phi_{Exit} = \Phi + \frac{n\pi}{4} - \quad (3)$$

$$\frac{1}{4}\tan^{-1}\left[\frac{\sqrt{1+u^2}\sin(2\Phi\sqrt{1+u^2})}{\cos(2\Phi\sqrt{1+u^2}) + u^2\cos^2(\Phi\sqrt{1+u^2})}\right]$$

where n=0, 1, 2, 3 ...

The optimized entrance polarizer angle for wavelength is given by $$\Phi_{Ent} = \frac{n\pi}{2} + \frac{1}{2}\tan^{-1}\left\{\frac{\sqrt{1+u^2}[\sqrt{1+u^2}\cos(2\Phi\sqrt{1+u^2})\tan 2(\Phi - \Phi_{Exit}) - \sin(2\Phi\sqrt{1+u^2})]}{u^2 + \cos(2\Phi\sqrt{1+u^2}) + \sqrt{1+u^2}\sin(2\Phi\sqrt{1+u^2})\tan 2(\Phi - \Phi_{Exit})}\right\} \quad (4)$$

Figure 2A:
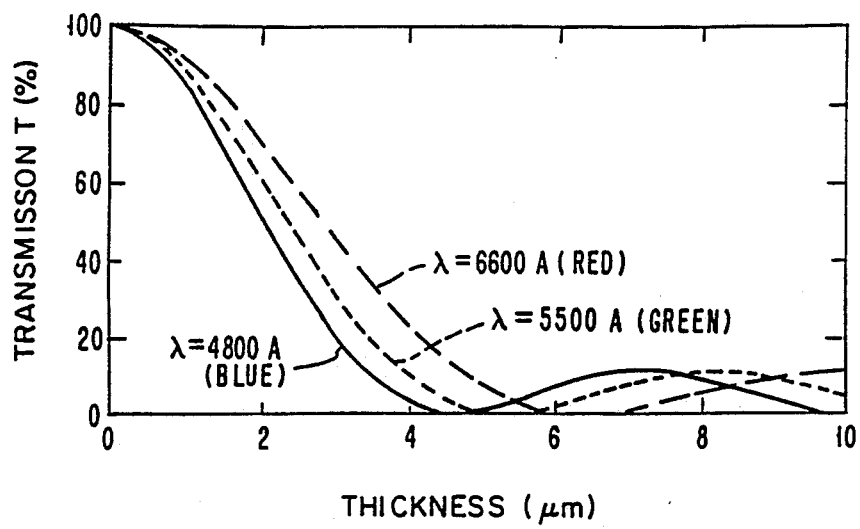
FIG. 2a and 2b are plots of transmission vs cell thickness for red, blue and green light wavelengths.
Figure 2B:
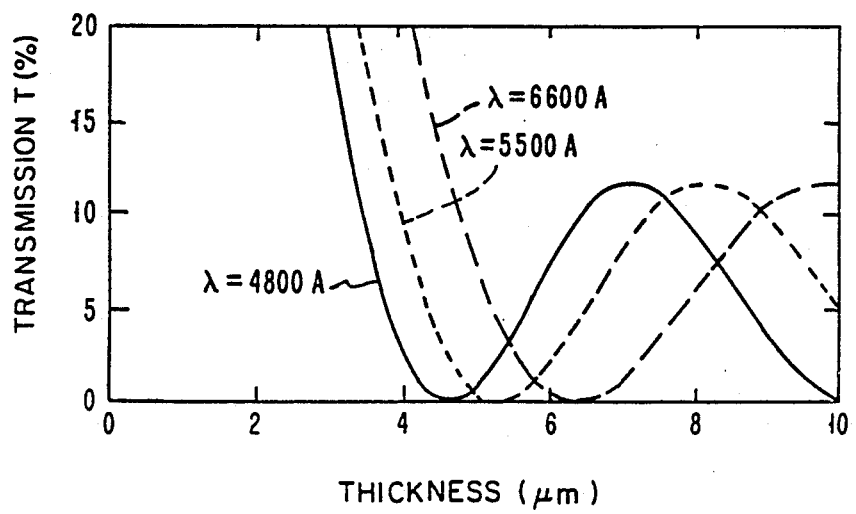

Equations 1-4 enable one to calculate, for any liquid crystal cell, optimum polarizer orientations for light of wavelength $\lambda$ to enable minimum off-state light transmission. Those equations were used to derive the curves shown in FIGS. 2a and 2b. As aforestated, those FIGS. illustrate that there is only one practical cell thickness (for a given wavelength), to achieve minimum light transmission. While there are larger thicknesses where minimum transmission occurs, cells of those thickness tend to switch too slowly to be practical.

Figure 3:
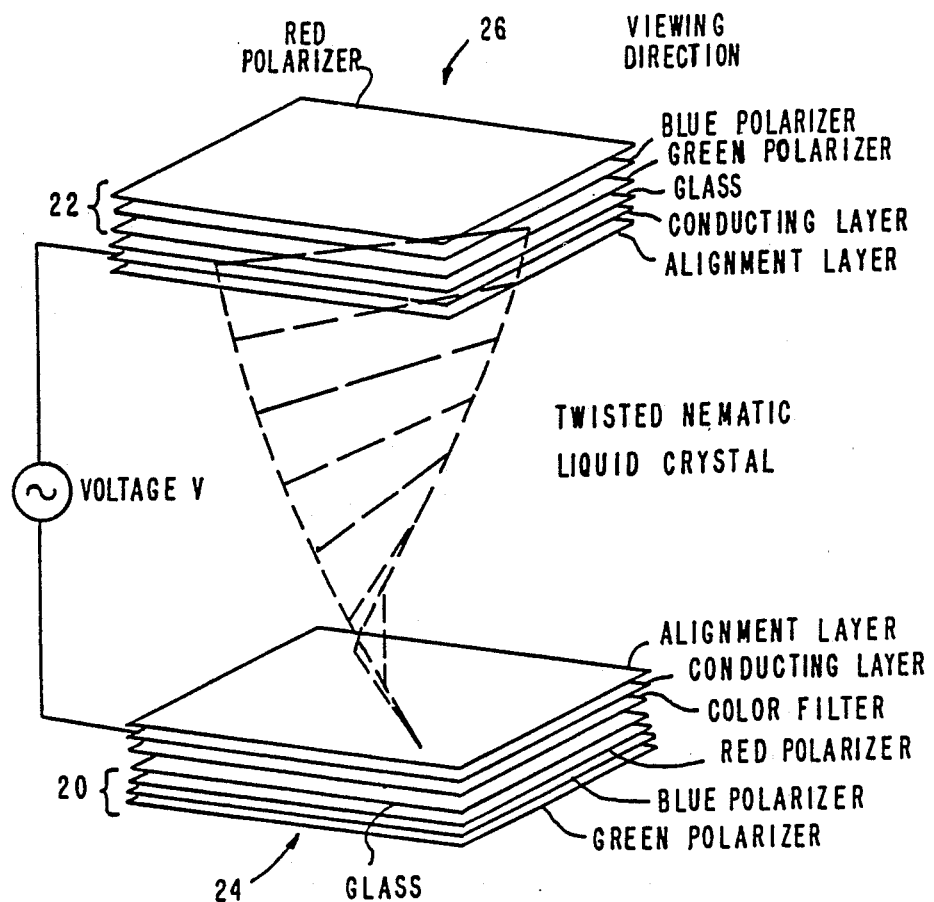
FIG. 3 is a schematic of a 90° TN left-handed liquid crystal cell constructed in accordance with the invention.

Referring now to FIG. 3, a TN liquid crystal cell is shown wherein the single entrance and exit polarizers shown in FIG. 1 have each been replaced by composite pleochroic polarizers 20 and 22. Each composite polarizer comprises a series of three superimposed polarizing sheets, each one adapted to polarize light of a certain wavelength and to pass, unpolarized all other wavelengths. At both entrance and exit surfaces 24 and 26 respectively, there is a composite polarizer which includes three individual sheets for polarizing red, blue and green light wavelengths (i.e., 6600 A, 5500 A and 4800 A). Thus, a green polarizing sheet polarizes only 5500 A light but no other, etc. Such selective polarizing sheets are available from Sanritsu Electric Co., Ltd., 1-30-13, Narimasu, Itabashi-Ku, Tokyo, Japan 175.

For each selective pair of entrance and exit, red, blue and green polarizing sheets, polarization orientations are chosen such that, for the given color, minimum transmission occurs when the liquid crystal is in the off-state. The optimized polarizer orientations, ($\phi_{Ent}$, $\phi_{Exit}$), depend mainly on liquid crystal refractive indices, twist angle, cell thickness, pretilt angle, and wavelength of the light. At the optimized polarizer orientation for each LC cell structure. There are two sets of polarizer orientations, ($\phi_{Ent}$, $\phi_{Exit}$) such that zero off-state transmission is obtained. This is true for every color. For a TN LC cell with 90° twist angle and an LC with $n_o=1.50$, $n_e=1.59$, $\theta_s=1°$, and cell thickness of d=5.5 microns, at zero off-state transmission, ($\phi_{Ent}=6.1°$, $\phi_{Exit}=-6.1°$), or ($\phi_{Ent}=96.1°$, $\phi_{Exit}=83.9°$) for blue; ($\phi_{Ent}=1.3°$, $\phi_{Exit}=-1.3°$), or ($\phi_{Ent}=91.3°$, $\phi_{Exit}=88.7°$) for green; and ($\phi_{Ent}=-5.0°$, $\phi_{Exit}=5.0°$), or ($\phi_{Ent}=85.0°$, $\phi_{Exit}=95.0°$) for red. Thus, the rotary dispersion in TN LCD's can be minimized by a composite polarizer configuration with each entrance and exit color polarizer set, optimized for the respective color.

Figure 4:
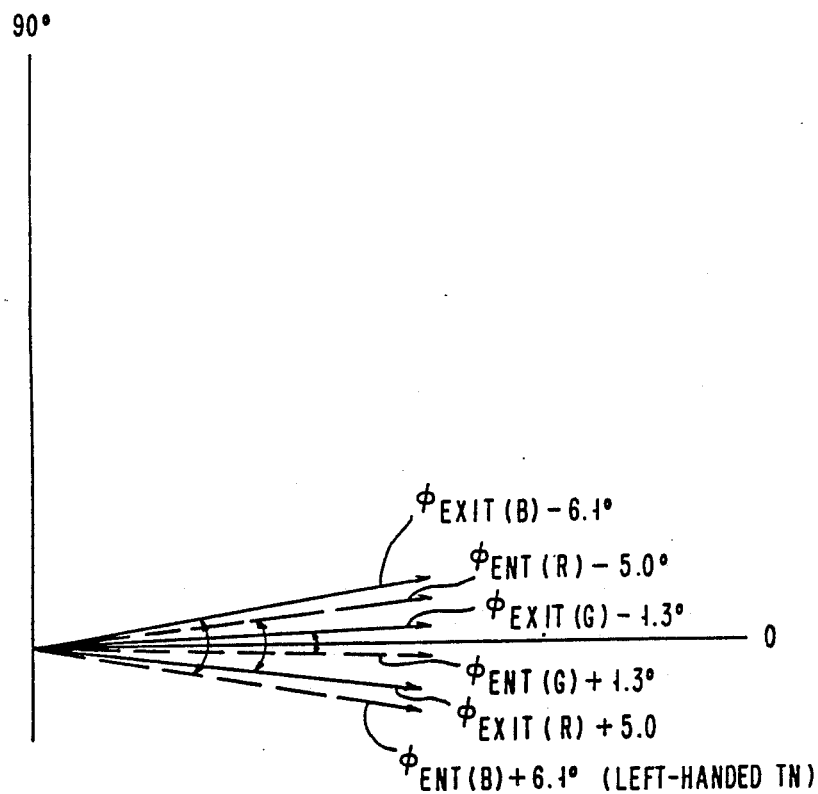
FIG. 4 is a plot of entrance and exit polarization angles for a 90° TN liquid crystal cell which incorporates the invention.

FIG. 4 illustrates one set of polarizer orientations as above calculated. Note that the blue and green entrance polarizers have their polarizing axes oriented at 6.1° and 1.3° whereas the red entrance polarizing axis is −5.0°. Furthermore, while the exit polarizing axes are equal and opposite about the 0° axis, this need not be the case, as it is strictly the outcome of the calculation of equations 1-4 which controls.

Referring now to FIG. 5, an exploded view is shown of a composite pleochroic polarizer which includes red, blue and green polarizing sheets 30, 32 and 34. Each sheet contains an absorber which is color wavelength sensitive and allows only light polarization of the particular color to pass which is orthogonal to the absorber's axis. Other colors pass unpolarized. As can be seen, once incident light 36 has passed through sheets 30, 32 and 34, each of the primary colors is incident upon a color filter sheet 38 with a desired angle of polarization. Filter 38 enables one of the polarized colors (e.g. red) to pass into the liquid crystal material and through to the appropriately polarized, exit composite polarizing sheet (oriented as dictated by equation 3).

Figure 6:
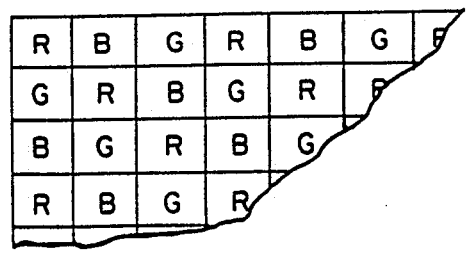
FIG. 6 is a schematic of a color filter sheet usable with the invention.

While only a single color filter 38 is shown, it is known to those skilled in the art that a full color display requires a composite filter of the type shown in FIG. 6, wherein each section denoted R, B or G passes only red, blue or green light respectively. Such a filter is contemplated for inclusion in the structure shown in FIG. 3.

A full-color, LCD using the above described composite pleochroic polarizer configuration will have equal and complete darkness in the off-state for all colors. But due to different polarizer orientations, light transmission in the on state may be slightly different.

Equal transmitted intensity for all colors is obtained through adjusting the spectral distribution of the light source and color filter. For transmissive applications, high contrast ratio rather than high brightness is of primary importance because the brightness can be adjusted, within reasonable limits, by means of back illumination.

A preferred cell geometry is obtained by first choosing the cell thickness so that green color is at zero off-state transmission using parallel polarizers. This can be done with a cell thickness d=5.29 microns for 5500 A. This gives $\phi^g_{Ent}\phi^g_{Exit}=0°$ or 90°. The blue and red polarizers are then optimized such that zero transmission is also obtained for blue and red colors. That is, $\phi^b_{Ent}=4.6°$, $\phi^b_{Exit}=-4.6°$ or 94.6° and 85.4° respectively, for blue; and $\phi^r_{Ent}=-6.5°$, $\phi^r_{Exit}=6.5°$ or 83.5° and 96.5° respectively for red. Using this geometry, all three colors have zero off-state transmission, and almost the same transmission in the on-state, with green having the maximum transmission. The relative transmission for blue; green; red colors is 0.97; 1; and 0.95. Consequently little adjustment, or even no adjustment of the light source and color filter is necessary for equal intensity in the on-state for all colors.

It should be understood that while the invention has been described with respect to a 90° TN liquid crystal cell, it is applicable to all twisted nematic LCD's having different cell thickness, pretilt angle, twist angle, and LC materials including twisted guest host LCD, 270° supertwisted guest host LCD, supertwisted birefringent effect LCD, highly twisted birefringent effect LCD and optical mode interference effect LCD.

The invention can be used with positive and negative LCD's (where the off-state is bright and the on-state is dark); with a TN with dichroic dyes, including 90° twisted nematic guest-host LCD, and 270° twisted nematic guest-host LCD; with transmissive mode, reflective mode and transflective mode LCD's It can be also used for any color combination (including white), besides the standard blue, green and red colors and for field sequential color displays.

The invention can also be used to optimize a color TN LCD at different LC orientation, (such as a nonuniform TN field-off state and field-on state). This is also important for high pre-tilt, super-twist birefringent effect LCD cells. The polarizer orientation can also be chosen to optimize a color TN LCD at some chosen oblique incidence angle.

It is to be understood that the above described embodiments of the invention are illustrative only and that modifications throughout may occur to those skilled in the art. Accordingly, this invention is not to be regarded as limited to the embodiments disclosed herein, but is to be limited as defined by the appended claims.

What is claimed is:

1. A liquid crystal display device comprising:
   a cell having two transparent sheets separated by a constant predetermined distance;
   TN liquid crystal material disposed between said transparent sheets, said TN liquid crystal means acting to rotate the polarization vector of different light colors by different amounts for a given distance of travel by a light color through said TN liquid crystal material;
   at least three color-specific polarizer plates in sandwich relationship with one said transparent sheet, each said polarizer plate oriented to provide light of a specific color with a known entry polarization, so that said TN liquid crystal material causes the polarization vector of each said light color to rotate by a known amount over said predetermined distance; and
   output polarizer means adjacent said second transparent sheet and having an absorption axis parallel to each said rotated color polarization vector.

2. The invention as defined in claim 1 wherein said output polarizer means comprises three color specific polarizer plates.

3. The invention of claim 2 further comprising:
   color filter means associated with at least one said transparent sheet.

4. The invention as defined in claim 3 wherein said color filter means comprises a plurality of red, blue, green filter areas.

5. The invention as defined in claim 4 further comprising means for applying across said TN liquid crystal means, a voltage which causes said TN liquid crystal means to orient along the field lines created by said applied voltage.

6. A liquid crystal cell of planar form and constant thickness comprising:
   first red, blue and green superimposed polarizing plates adjacent one side of said cell; and
   second red, blue and green superimposed polarizing plates adjacent the other side of said cell, each of said second plates having a direction of polarization perpendicular to a rotated polarization direction created by said liquid crystal cell for its respective color.

* * * * *